(12) United States Patent
Porta et al.

(10) Patent No.: US 8,571,767 B2
(45) Date of Patent: Oct. 29, 2013

(54) METHOD OF CONTROLLING A FRICTION CLUTCH IN A MOTOR-VEHICLE TRANSMISSION

(75) Inventors: Attilio Porta, Orbassano (IT); Emanuel Corigliano, Orbassano (IT); Giancarlo Osella, Orbassano (IT); Dario Del Pin, Orbassano (IT); Marco Montu', Orbassano (IT); Massimo Lupo, Orbassano (IT)

(73) Assignee: CRF Societa Consortile per Azioni, Orbasdano (Torino) (IT)

( * ) Notice: Subject to any disclaimer, the term of this patent is extended or adjusted under 35 U.S.C. 154(b) by 765 days.

(21) Appl. No.: 12/620,989

(22) Filed: Nov. 18, 2009

(65) Prior Publication Data

US 2010/0138121 A1 Jun. 3, 2010

(30) Foreign Application Priority Data

Dec. 3, 2008 (EP) .................................. 08425772

(51) Int. Cl.
*F16H 59/00* (2006.01)
*B60W 10/02* (2006.01)

(52) U.S. Cl.
USPC ................... 701/51; 701/67; 477/90; 477/98; 477/166

(58) Field of Classification Search
USPC ............ 701/51, 67, 68; 192/54.1; 477/34, 90, 477/97, 98, 166, 174
See application file for complete search history.

(56) References Cited

FOREIGN PATENT DOCUMENTS

| DE | 10 2007 015 679 A1 | 10/2008 |
|---|---|---|
| EP | 1 411 262 A2 | 4/2004 |
| EP | 1411262 A2 * | 4/2004 |
| EP | 1 418 083 A2 | 5/2004 |
| EP | 1418083 A2 * | 5/2004 |
| EP | 1 630 442 A1 | 3/2006 |
| EP | 1630442 A1 * | 3/2006 |
| EP | 1 840 401 A1 | 10/2007 |

* cited by examiner

*Primary Examiner* — Thomas Tarcza
*Assistant Examiner* — Adam Tissot
(74) *Attorney, Agent, or Firm* — Sughrue Mion, PLLC

(57) ABSTRACT

The method comprises the steps of:
storing a curve or characteristic of torque transmitted by the friction clutch as a function of the position of the clutch,
calculating a desired value of the torque to be transmitted by means of the clutch, and
modifying the position of the clutch so as to bring it to the position to which the desired transmitted torque value corresponds according to the stored curve or characteristic,
upon the occurrence of predetermined operative conditions, estimating the value of the torque transmitted by the clutch, by means of an algorithm, as a function of the detected instantaneous values of the torque delivered and of the angular velocity of the shaft of the engine, and detecting the corresponding instantaneous position or estimate position of the clutch, and
then modifying the previously stored curve or characteristic in accordance with predetermined procedures in dependence on the difference between the estimated value of the torque transmitted and that value of the torque transmitted which corresponds to the estimate position according to the previously stored curve or characteristic.

12 Claims, 4 Drawing Sheets

METHOD OF CONTROLLING A FRICTION CLUTCH IN A MOTOR-VEHICLE TRANSMISSION

Figure 1:
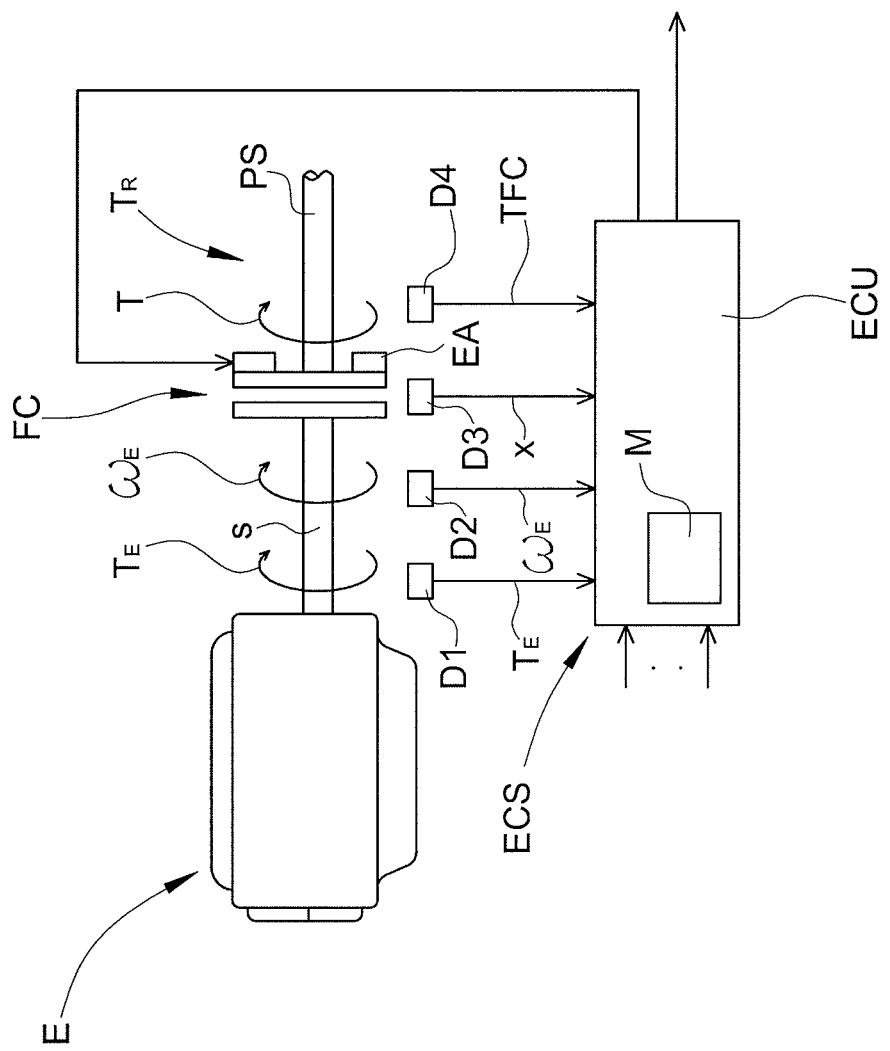

The present invention relates to a method of controlling a friction clutch in a transmission of a motor vehicle provided with an internal combustion engine.

More specifically, the subject of the invention is a control method comprising the steps of:
- storing a characteristic curve of torque transmitted by the friction clutch as a function of the position of the clutch,
- calculating a desired value of the torque to be transmitted by means of the clutch, and
- modifying the position of the clutch so as to bring it to the position to which the desired transmitted torque value corresponds according to the stored curve or characteristic.

Controlled friction clutches are being used more and more in motor-vehicle transmissions, for example, in so-called "dual clutch" transmissions. In use, the movable portion of a clutch of this type is brought, by means of suitable conventional actuators, to an operative position (relative to the stationary portion) in which the clutch transmits the desired nominal torque.

The curve or characteristic of torque transmitted/position of a clutch of this type inevitably varies over time owing to degradation and ageing phenomena and because of wear of the friction linings.

Consequently, with the passage of time, the torque transmission that corresponds to a predetermined position (of the movable portion) of a clutch of this type is gradually reduced.

An object of the present invention is to propose a control method which overcomes this disadvantage.

This and other objects are achieved, according to the invention, by a method of the type specified above, characterized in that, upon the occurrence of predetermined operative conditions, the value of the torque transmitted by the clutch is estimated, by means of an algorithm, as a function of the detected instantaneous values of the torque delivered and of the angular velocity of the shaft of the engine, and the corresponding instantaneous position, or estimate position, of the clutch is detected, and the previously stored curve or characteristic is then modified in accordance with predetermined procedures in dependence on the difference between the estimated value of the torque transmitted and that value of the torque transmitted which corresponds to the estimate position according to the previously stored curve or characteristic.

Typically, the torque transmitted by the friction clutch is estimated during a normal operating cycle of the associated actuator, in particular during the pick-up and gear-changing stages.

In one embodiment, the stored transmissibility curve or characteristic comprises a plurality of contiguous linear sections corresponding to respective adjacent ranges or bands of values of the position of the clutch.

During the implementation of the method, the torque transmitted values that are associated with the ends of the range or band in which the estimate position is included are modified in accordance with predetermined procedures.

In particular, the torque values that are associated with the ends are modified in dependence on the difference between the estimated value of the torque transmitted and that value which is associated with the same position of the clutch according to the previously stored characteristic or curve.

Figure 2:
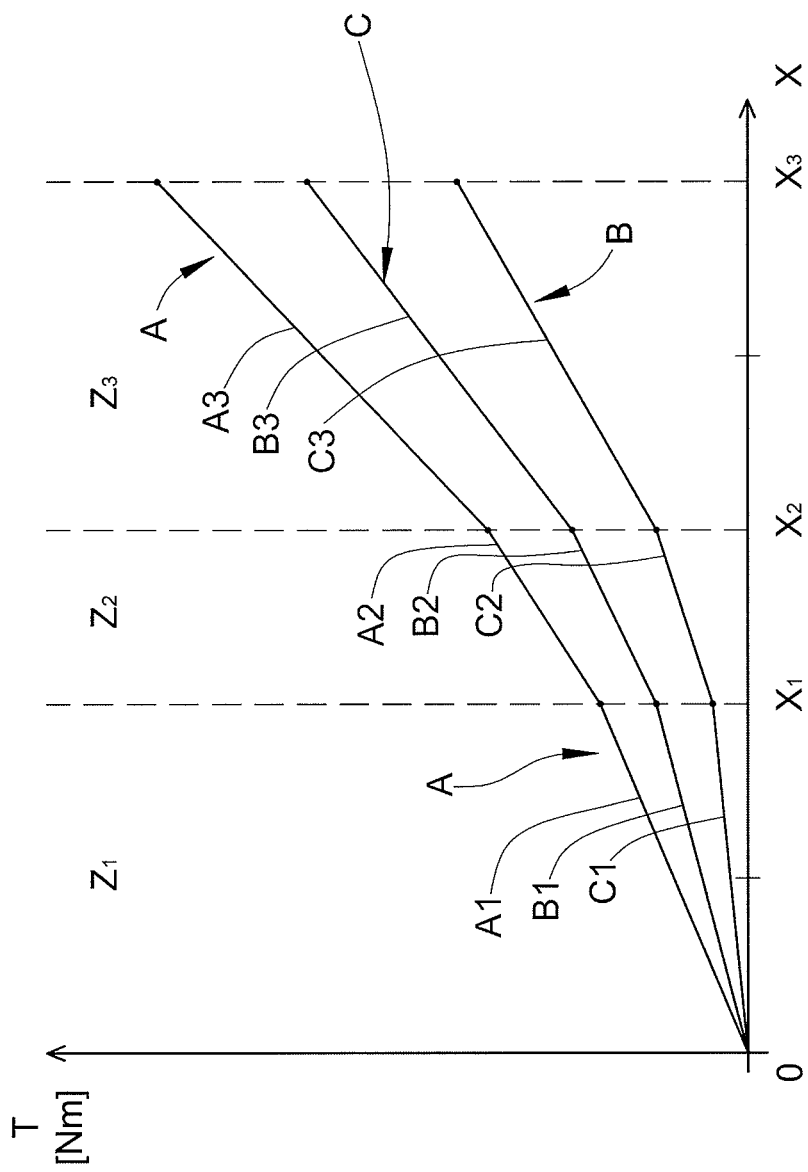
Figure 3:
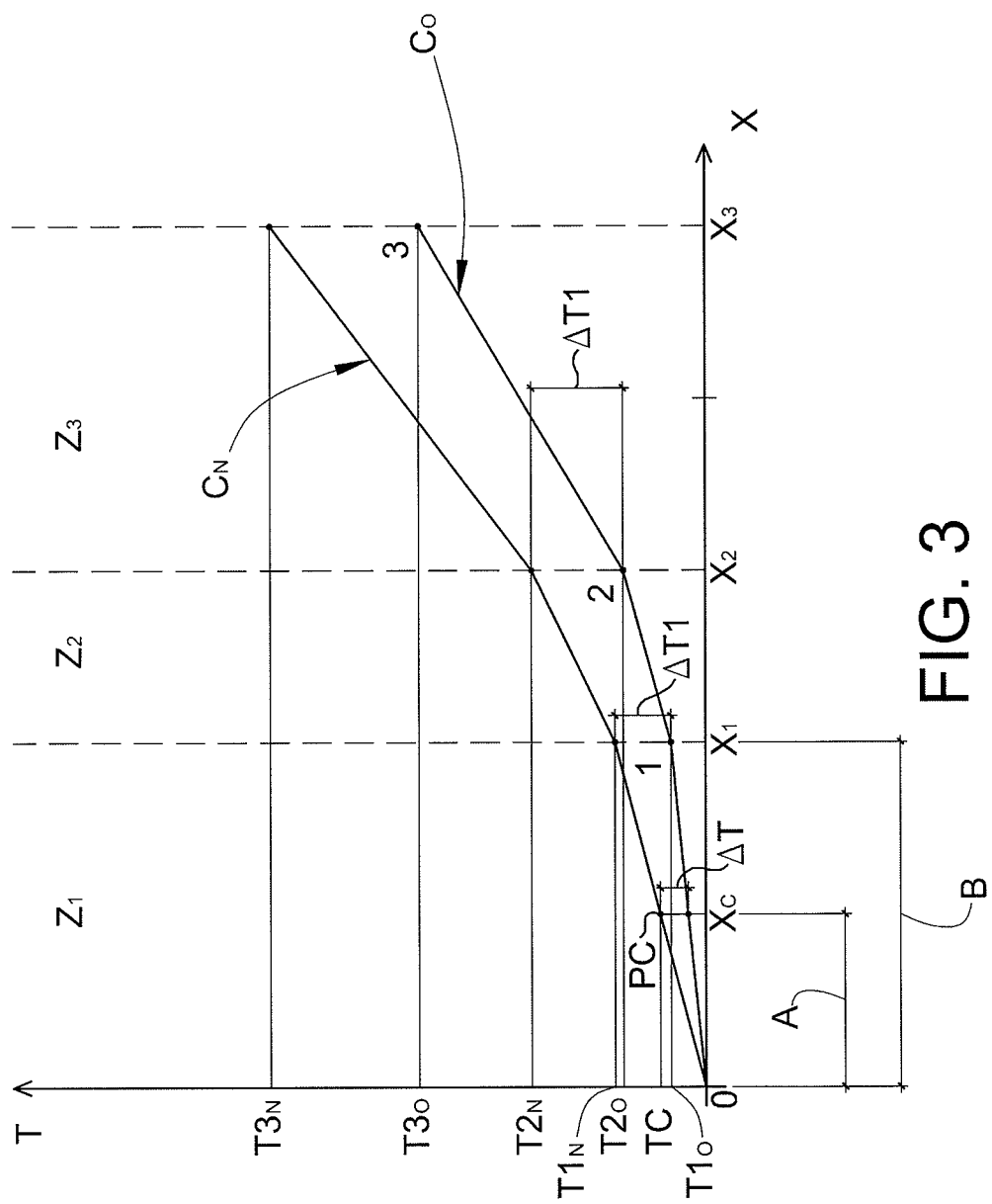
Figure 4:
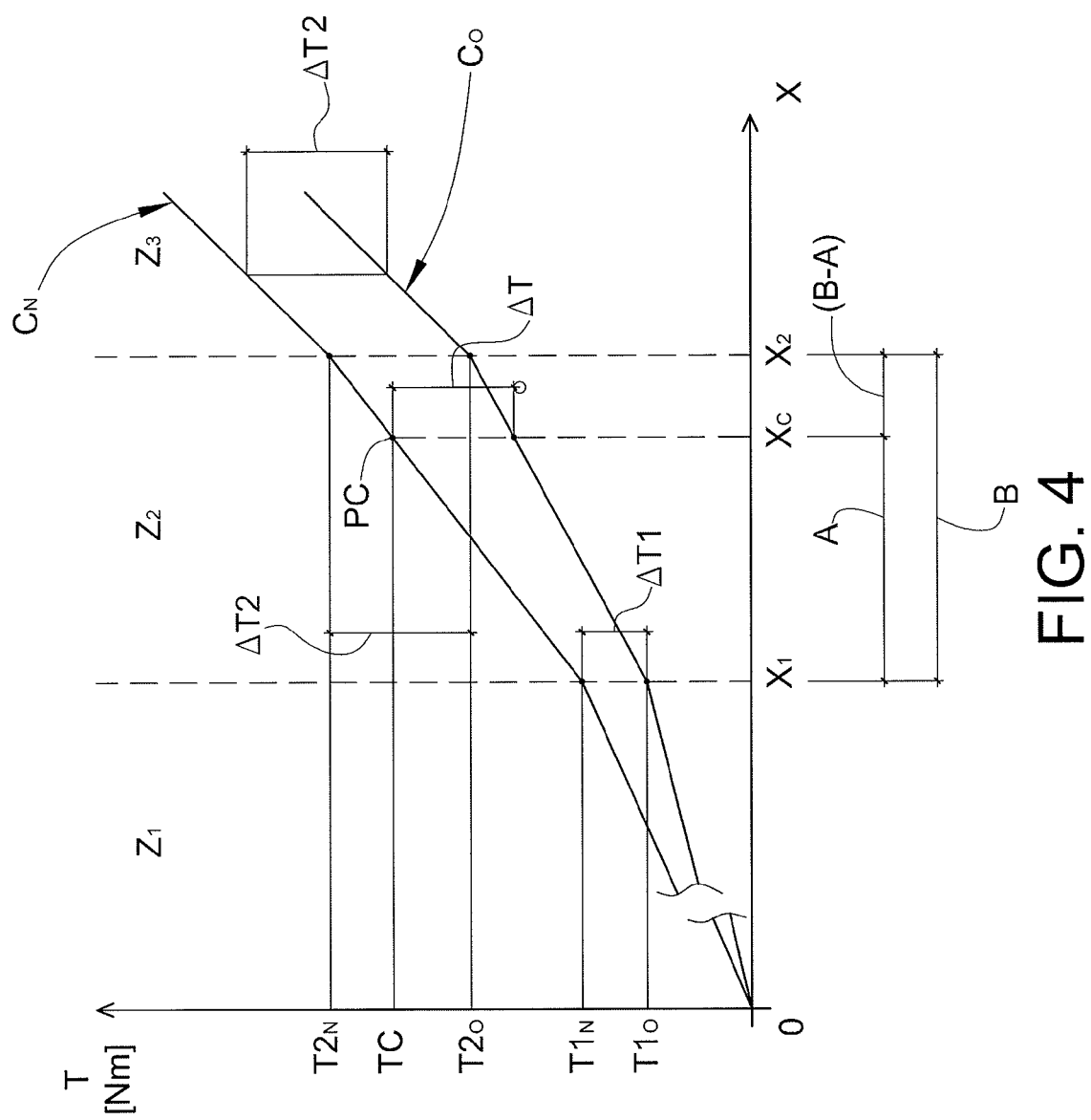

Further characteristics and advantages of the invention will become clear from the following detailed description which is given purely by way of non-limiting example with reference to the appended drawings, in which:

FIG. 1 is a block diagram of a motor-vehicle transmission comprising a friction clutch controlled by the method according to the invention, FIG. 2 is a graph which shows the linearized traces of the transmissibility curve or characteristic of a friction clutch, and FIGS. 3 and 4 are two graphs which illustrate the procedure for updating a stored transmissibility curve or characteristic.

In FIG. 1, a motor-vehicle internal combustion engine, indicated E, has a shaft S which can be connected to a primary shaft PS of a transmission TR by means of a controlled friction clutch FC. The clutch FC is of known type and the position x of its movable portion is controlled by means of an associated actuator EA which may be, for example, an electromagnetically-operated actuator.

The actuator EA is driven by an electronic control system, generally indicated ECS. This system comprises an electronic processing and control unit ECU which receives signals or data from a plurality of sensors and detectors. In particular, the following are connected to the electronic unit ECU:
- a detector D1 for supplying signals or data indicative of the value of the torque $T_E$ developed in the shaft S of the engine E,
- a detector D2, for example, of the phonic wheel type, for supplying signals or data indicative of the angular velocity $\omega_E$ of the shaft S of the engine E,
- a detector D3 for supplying signals or data indicative of the position x of the movable portion of the clutch FC relative to the stationary portion, and
- a detector D4 for supplying signals or data indicative of the temperature TFC of the friction clutch FC.

Further sensors or detectors, not shown in FIG. 1, are also connected to the unit ECU for supplying thereto signals or data on the basis of which the unit ECU can detect the occurrence of predetermined operative conditions such as those which will be described further below.

In operation, the clutch transfers to the shaft PS of the transmission TR a variable fraction of the torque $T_E$ developed by the engine E, according to the degree of closure of the clutch FC. The torque transmitted to the shaft PS of the transmission TR by means of the clutch FC is indicated T in FIG. 1 as well as in the following drawings.

The torque T transmitted is thus a function of the position x (of the movable portion) of the clutch FC.

A memory M (FIG. 1) is associated with the electronic unit ECU; a curve or characteristic representative of the torque T transmitted by the clutch FC as a function of the position x is stored in the memory M.

In general, for a typical friction clutch for automotive use, the curve or characteristic of transmissibility (torque transmitted as a function of position) has a non-linear shape.

In the method according to the invention, the transmissibility curve or characteristic of a clutch of this type is approximated by means of a plurality of contiguous linear sections corresponding to respective adjacent ranges or bands of clutch position values, as shown in FIG. 2.

In this drawing, the clutch position X is given on the abscissa and the torque T transmitted by the clutch is given on the ordinate.

The position X may correspond precisely to the actual position x of the movable portion of the clutch or may be a "standardized" position obtained, for example, by dividing the values of the position x by the value $x_M$ (maximum of the position x), possibly multiplied by a scaling factor, for example, of 1000.

With reference to FIG. 2, for a "new" clutch (never used), the transmissibility curve or characteristic is, for example, that indicated A.

In conditions of maximum wear, the transmissibility curve or characteristic of the same clutch has a linearized trace of the type shown by the curve B of FIG. 2.

In a generic intermediate condition between minimum (zero) wear and maximum wear, the transmissibility curve or characteristic of the clutch has an intermediate trace between the curves A and B, for example, the trace of the linearized curve indicated C in FIG. 2.

The linearization of the transmissibility characteristics shown in FIG. 2 arranges for each curve or characteristic to comprise three contiguous, functionally constant (linear) sections A1-A3, B1-B3, C1-C3 in respective adjacent ranges or bands Z1-Z3 of values of the clutch position X.

In FIG. 2, the band Z1 extends between the value 0 (origin point) and a value X1 of the position X, the band Z2 extends between the value X1 and a value X2 of the position X, and the band Z3 extends between the value X2 and a value X3 of the position X.

The values 0, X1, X2 and X3 will also be referred to below as "ends" of the above-mentioned ranges of bands of clutch position values.

Initially, an intermediate transmissibility curve or characteristic between those corresponding to the "new" clutch condition and the "maximum wear" condition, for example, the transmissibility curve of the type indicated C in FIG. 2, is stored in the memory M of the electronic unit ECU.

Subsequently, when the motor-vehicle is in use, the unit ECU arranges from time to time for the transmissibility curve or characteristic to be checked and possibly updated in the manner which will now be described.

From time to time, the unit ECU arranges to estimate, in predetermined operative conditions, the value TC of the torque T instantaneously transmitted by the clutch FC as a function of the detected instantaneous values of the torque $T_E$ delivered by the engine E and of the angular velocity $\omega_E$ of the engine shaft S, at the same time detecting the corresponding value XC of the corresponding instantaneous position of the clutch, hereinafter defined as the "estimate position".

The value TC of the torque T transmitted by the clutch FC is estimated, for example, on the basis of the following equation:

$$TC = T_E - J_E \frac{d\omega_E}{dt} \quad (1)$$

where $J_E$ is the moment of inertia of the shaft S of the engine E and t is the time.

Alternatively, with a more "refined" approach, the value TC of the torque T transmitted by the clutch FC may be estimated on the basis of the following equation:

$$TC = f(TFC)\left[T_E - J_E \frac{d\omega_E}{dt}\right] \quad (2)$$

where f(TFC) is a predetermined function of the temperature TFC of the friction clutch FC.

The estimated value TC and the associated value XC of the friction clutch position identify a point indicated PC in the plane T, X in FIG. 3.

The transmissibility curve or characteristic stored in the memory M of the electronic unit ECU at the moment at which the value TC corresponding to the position XC of the friction clutch is estimated is indicated $C_O$ in FIG. 3.

If the point PC identified by the pair of values TC, XC lies on the curve or characteristic $C_O$ or within a neighbouring area of predetermined width, the electronic unit ECU does not proceed with any updating of the transmissibility curve or characteristic stored in the memory M.

If, on the other hand, as in the example of FIG. 3, the point PC lies considerably outside the curve $C_O$, the unit ECU arranges to modify the transmissibility curve or characteristic stored in the memory M in the manner which will now be described.

The graphs of FIG. 3 relate to a situation in which the estimated value TC of the torque T transmitted by the clutch and the associated clutch position value XC identify a point PC which lies within the range or band Z1; in other words, the estimate position XC falls within the range of positions which extends from 0 to X1, the width of which range is indicated B in FIG. 3.

In a situation of this type, the electronic unit ECU is arranged to modify the transmissibility curve or characteristic stored in the memory M by modifying first of all the section of that curve corresponding to the band Z1, and then the sections of that curve or characteristic which fall within the bands Z2 and Z3.

In the case to which FIG. 3 relates, in which the estimated point PC falls within band Z1, the modified transmissibility curve or characteristic must nevertheless pass through the origin reference point T, X so that, essentially, the unit ECU arranges to modify the inclination or slope of the first linear section of the transmissibility curve or characteristic. This in fact translates into a modification of the torque value that is associated with the upper end X1 of the first range or band Z1; this torque value is modified by a quantity corresponding to the torque difference ΔT (between the estimated value TC and the value of the torque T transmitted which, according to the previously stored curve or characteristic $C_O$, corresponds to the estimate position XC), multiplied by a factor which is a function of the estimate position XC.

The following equation can easily be derived from FIG. 3 by simple geometrical considerations:

$$T1_N = T1_o + \Delta T1 = T1_o + \frac{B}{A}\Delta T \quad (3)$$

where:

$T1_N$ is the new torque transmitted value associated with the position X1, $T1_O$ is the old torque transmitted value associated with the position X1 according to the previously stored transmissibility characteristic, A is the width of the range XC-0, and B=X1−0 is the width of the first range or band Z1.

The first linear section of the previously stored transmissibility curve or characteristic $C_O$ is thus replaced by the line joining the origin point 0 and the point $T1_N$, X1.

As shown in FIG. 3, the linear sections of the transmissibility curve or characteristic subsequent to the first section are also modified by translation by the same quantity ΔT1.

The curve or characteristic $C_N$ of FIG. 3 is then stored in the memory M in place of the previously stored curve or characteristic $C_O$.

The graphs of FIG. 4, on the other hand, show the procedure for modifying the stored transmissibility curve or characteristic when the point PC estimated, that is, identified by the estimated value TC of torque transmitted and by the associated position (estimate position) XC lies within a range or band subsequent to the first range or band Z1, in particular, in the range or band Z2.

In this case, the corresponding linear section of the stored transmissibility curve or characteristic is modified in a manner such that the transmitted torque values associated with the ends X1 and X2 of that range or band are modified by respective quantities ΔT1, ΔT2 which are predetermined in dependence on the torque difference ΔT between the estimated value TC and that torque value T which corresponds to the estimate position XC according to the previously stored transmissibility curve.

By analogy with the symbols used in FIG. 3, the distance between the estimate position XC and the lower end X1 of the band Z2 in which the position XC lies, and the width X2-X1 of the band Z2 are indicated A and B, respectively, in FIG. 4.

The electronic unit ECU is arranged to calculate the new torque transmitted values $T1_N$ and $T2_N$ that are associated with the positions X1 and X2 as functions of the values $T1_O$ and $T2_O$ that are associated with those positions according to the previously stored transmissibility curve or characteristic, on the basis of the following equations which can easily be derived from FIG. 4 on the basis of simple geometrical considerations:

$$T1_N = T1_o + \left(\frac{B-A}{B}\right)\Delta T \quad (4)$$

$$T2_N = T2_o + \frac{A}{B}\Delta T. \quad (5)$$

In summary, the transmitted torque values associated with the ends of the range in which the estimate position XC lies are modified by respective quantities which depend on the torque difference ΔT and on the respective distances A, B–A of those ends from the estimate position XC.

Still with reference to the case of FIG. 4, the linear section or sections of the transmissibility curve or characteristic subsequent to the range Z2 in which the estimate position (XC) lies are translated by a quantity equal to the modification ΔT2 of the transmitted torque value corresponding to the upper end X2 of the range Z2.

Again with reference to FIG. 4, the linear section of the transmissibility curve which precedes the range Z2 in which the estimate position XC lies is modified in a manner such that the torque value associated with the upper end X1 of the preceding range or band Z1 is modified by a quantity corresponding to the torque value modification ΔT1 for the lower end (X1) of the range Z2 in which the estimate position lies. In other words, the initial linear section of the new transmissibility curve $C_N$ is obtained by joining the origin reference point T,X to the initial point of the second linear section of the new transmissibility curve.

If the estimate position XC at which the value TC of the torque transmitted by the clutch FC is estimated lies in the upper range or band Z3, the unit ECU arranges, if necessary, to modify the transmissibility curve stored by operating in the same way as described above with reference to the case in which the estimate point PC lies in the second range or band Z2.

In any case, as already mentioned above, the updating of the transmissibility curve or characteristic stored in the memory M is enabled by the unit ECU only when predetermined operative conditions occur, for example, when the following conditions occur simultaneously:

a pick-up stage is in progress;
the torque $T_E$ produced by the engine E is within a predetermined range (for example, between 20 Nm and 450 Nm);
the engine E has reached a predetermined minimum temperature (for example, greater than 75° C.);
the temperature TFC of the clutch FC is within a predetermined range (for example, between 70 and 200° C.);
the angular acceleration of the shaft S of the engine E is below a predetermined value (for example, 50 rad/s$^2$);
the slipping velocity of the clutch FC is above a threshold (for example, 150 rpm);
the absolute value of the time derivative of the torque T transmitted by the clutch FC is less than or equal to a predetermined threshold value;
the change in the relative position of the clutch FC is kept above a threshold for a predetermined period of time (for example, 10 ms).

The above-described control method compensates for degradation and ageing of the friction clutch FC used and enables the performance of the control system to be ensured substantially throughout the useful life cycle of the component.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A method of controlling a friction clutch in a transmission of a motor vehicle provided with an internal combustion engine, the method comprising the steps of:
   storing a curve or characteristic of torque transmitted by the friction clutch as a function of the position of the clutch,
   calculating a desired value of the torque to be transmitted by means of the clutch, and
   modifying the position of the clutch so as to bring it to the position to which the desired transmitted torque value corresponds according to the stored curve or characteristic,
   wherein:
   upon the occurrence of predetermined operative conditions, the value of the torque transmitted by the clutch is estimated, by means of an algorithm, as a function of the detected instantaneous values of the torque delivered and of the angular velocity of the shaft of the engine, and the corresponding instantaneous position or estimate position of the clutch is detected,
   the previously stored curve or characteristic is then modified in dependence on the difference between the estimated value of the torque transmitted and that value of the torque transmitted which corresponds to the estimate position according to the previously stored curve or characteristic;
   the stored curve or characteristic comprises a plurality of contiguous, functionally constant sections corresponding to respective adjacent ranges or bands of values of the position of the clutch, the torque values associated with the ends of the range or band in which the estimate position is included are modified in accordance with predetermined procedures, and
   the value of the torque transmitted by the clutch is estimated as a function of the temperature of the clutch.

2. A method according to claim 1, in which the torque values associated with the ends are modified in dependence on the difference between the estimated value of the torque transmitted and that value which is associated with the same position of the clutch according to the previously stored characteristic or curve.

3. A method according to claim 2 in which, for the first range or band starting from the origin, the modification of the curve or characteristic of torque transmitted is such that the modified curve or characteristic also comes from the origin.

4. A method according to claim 3 in which, when the estimate position lies within the first range or band, the corresponding first functionally constant section of the stored curve or characteristic is modified in a manner such that the torque value that is associated with the upper end of the first range or band is modified by a quantity corresponding to the difference in torque transmitted multiplied by a factor which is a function of the estimate position.

5. A method according to claim 4 in which the factor is a function of the distance between the estimate position and the ends of the first range or band.

6. A method according to claim 5 in which the factor is equal to the ratio between the width of the first range or band and the distance between the estimate position and the origin.

7. A method according to claim 4 in which the functionally constant sections of the curve or characteristic subsequent to the first section are translated by said quantity.

8. A method according to claim 2 in which, when the estimate position lies within a range subsequent to the first range, the corresponding functionally constant section of the stored curve or characteristic is modified in a manner such that the torque transmitted values that are associated with the ends of the range are modified by respective quantities which are predetermined in dependence on the torque difference and the respective distances from the estimate position.

9. A method according to claim 8 in which the functionally constant sections of the stored curve or characteristic which are subsequent to the range in which the estimate position lies are translated by a quantity equal to the modification of the value of the torque transmitted at the upper end of the range.

10. A method according to claim 8 in which the functionally constant section of the stored curve or characteristic which precedes the range in which the estimate position lies is modified in a manner such that the torque value that is associated with the upper end of the preceding range is modified by a quantity corresponding to the modification of the torque value for the lower end of the range in which the estimate position lies.

11. A method according to claim 1 in which the torque transmitted by the clutch is estimated by finding the difference between the detected engine torque and the product of the moment of inertia of the shaft of the engine and the angular acceleration of the shaft.

12. A method according to claim 11 in which the difference is multiplied by a factor which is a predetermined function of the detected temperature of the clutch.

* * * * *